(12) United States Patent
Hart (10) Patent No.: US 10,253,815 B2
(45) Date of Patent: Apr. 9, 2019

(54) ROLLING BEARING ASSEMBLY INCLUDING A CRIMPED SEALING ASSEMBLY HAVING A GROUNDING ELEMENT

(71) Applicant: Schaeffler Technologies AG & Co. KG, Herzogenaurach (DE)

(72) Inventor: Scott Hart, Sharon, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/689,649

(22) Filed: Aug. 29, 2017

(65) Prior Publication Data

US 2019/0063500 A1   Feb. 28, 2019

(51) Int. Cl.
  *F16C 19/06* (2006.01)
  *F16C 35/04* (2006.01)
  (Continued)

(52) U.S. Cl.
  CPC ........ *F16C 33/785* (2013.01); *F16C 33/7869* (2013.01); *F16C 35/042* (2013.01); *F16C 35/067* (2013.01); *F16C 41/002* (2013.01); *F16J 15/3268* (2013.01); *F16C 19/06* (2013.01); *F16C 35/04* (2013.01); *F16J 15/16* (2013.01)

(58) Field of Classification Search
  CPC .. F16C 19/06; F16C 33/7843; F16C 33/7856; F16C 33/7869; F16C 35/04; F16C 41/002; F16F 33/7843; Y10T 29/49703; F16J 15/16; F16J 15/32; F16J 15/3268

USPC ....... 384/476, 477, 478, 482, 488, 490, 493; 277/349, 353, 359, 577, 597; 29/989.11, 29/898.11

See application file for complete search history.

(56) References Cited

U.S. PATENT DOCUMENTS 2,208,700 A * 7/1940 Murden .............. F16C 33/7853
  277/565
2,741,500 A * 4/1956 Large .................. F16C 33/7843
  277/353

(Continued)

FOREIGN PATENT DOCUMENTS

DE       10259400 A1 * 7/2007 ............... F16J 15/32
DE   102015224044 A1 * 1/2016 ........... F16J 15/3284

(Continued)

*Primary Examiner* — Marcus Charles
(74) *Attorney, Agent, or Firm* — Volpe and Koenig, P.C.

(57) ABSTRACT

A rolling bearing assembly has a first ring including a first race, a second ring including a second race, and a plurality of rolling elements in rolling contact with the first and second races. The rolling bearing assembly also has a sealing assembly including a first end in contact with the first ring and a second end in contact with the second ring. The sealing assembly has a shield, a sealing element, and a grounding element. The shield has an attachment section in which a free end of the shield is crimped such that it is bent around the sealing element and the grounding element to thereby hold the shield, the sealing element, and the grounding element together with the shield in contact with the first ring and the grounding element in contact with the second ring. The sealing assembly thus creates an electrically conductive path between the first ring and the second ring.

18 Claims, 7 Drawing Sheets

(51) Int. Cl.
*F16J 15/16* (2006.01)
*F16C 33/78* (2006.01)
*F16C 41/00* (2006.01)
*F16C 35/067* (2006.01)
*F16J 15/3268* (2016.01)

(56) References Cited

U.S. PATENT DOCUMENTS

| | | | |
|---|---|---|---|
| 2,967,743 A * | 1/1961 | Howe, Jr. | F16C 33/7853 |
| | | | 277/565 |
| 3,268,984 A * | 8/1966 | Kupchick | F16J 15/3228 |
| | | | 277/577 |
| 3,630,530 A * | 12/1971 | Mackas | F16C 33/7853 |
| | | | 277/375 |
| 3,792,912 A * | 2/1974 | Howe, Jr. | F16C 13/006 |
| | | | 277/348 |
| 4,333,694 A * | 6/1982 | Howe, Jr. | F16C 33/7856 |
| | | | 277/402 |
| 4,676,671 A * | 6/1987 | Gossmann | F16C 33/6618 |
| | | | 384/480 |
| 4,801,270 A | 1/1989 | Scarlata | |
| 5,121,999 A * | 6/1992 | Johnson | F16C 33/78 |
| | | | 384/477 |
| 5,313,129 A | 5/1994 | Stewart | |
| 5,560,715 A * | 10/1996 | Mosby | F16C 33/7856 |
| | | | 29/898.11 |
| 5,812,908 A | 9/1998 | Laracca et al. | |
| 5,914,547 A | 6/1999 | Barahia et al. | |
| 5,988,996 A | 11/1999 | Brookbank et al. | |
| 6,755,572 B1 * | 6/2004 | Kinbara | F16C 19/52 |
| | | | 384/462 |
| 7,136,271 B2 | 11/2006 | Oh et al. | |
| 7,193,836 B2 | 3/2007 | Oh et al. | |
| 7,339,777 B2 | 3/2008 | Barnard et al. | |
| 7,521,827 B2 | 4/2009 | Orlowski et al. | |
| 7,528,513 B2 | 5/2009 | Oh | |
| 8,169,766 B2 | 5/2012 | Ok et al. | |
| 8,183,727 B2 | 5/2012 | Fee et al. | |
| 8,189,317 B2 | 5/2012 | Oh et al. | |
| 8,199,453 B2 | 6/2012 | Oh et al. | |
| 8,421,286 B2 | 4/2013 | Bossaller et al. | |
| 8,488,293 B2 | 7/2013 | Baumann | |
| 8,604,653 B2 | 12/2013 | Orlowski et al. | |
| 8,632,251 B2 * | 1/2014 | Moratz | F16C 33/7843 |
| | | | 384/476 |
| 8,664,812 B2 | 3/2014 | Vicars et al. | |
| 9,175,728 B2 | 11/2015 | White | |
| 9,227,720 B2 * | 1/2016 | Habibvand | B64C 9/02 |
| 2003/0001444 A1 * | 1/2003 | Coles | F16J 15/3284 |
| | | | 310/90 |
| 2011/0039648 A1 * | 2/2011 | Lannutti | F16C 13/006 |
| | | | 474/166 |

FOREIGN PATENT DOCUMENTS

| | | | | |
|---|---|---|---|---|
| DE | 102016217872 A1 * | 4/2017 | | F16C 33/82 |
| GB | 990354 A * | 4/1965 | | F16C 33/7853 |
| JP | 2008286229 A * | 11/2008 | | F16C 33/78 |

* cited by examiner

Fig. 7

ROLLING BEARING ASSEMBLY INCLUDING A CRIMPED SEALING ASSEMBLY HAVING A GROUNDING ELEMENT

FIELD OF INVENTION

The present invention relates to a rolling bearing assembly, and, more particularly, to electrical discharge damage protection for a rolling bearing assembly with a crimped sealing assembly having a grounding element.

BACKGROUND

Rolling bearings are widely used in various mechanical applications, including automotive and industrial applications. Grounding devices are used to prevent shaft induced currents from causing electrical discharge machining (EDM) due to electrical currents passing through rolling bearing components. EDM causes pitting, fluting, and fusion craters on the rolling bearing components resulting in premature rolling bearing failure. Known EDM prevention methods include di-electric ceramic bearing coatings, Faraday shields, electrically conductive bearing grease, and shaft-contacting ground brushes.

Some current designs utilize a separate component to conduct electric current though a low impedance path parallel to the path through the rolling element bearing components. These alternative designs require additional components Some of these designs utilize large additional components to the bearing that take up extra space or require additional assembly efforts to create the electrical connection to the ground. This requires more space outside of the bearing, additional components and extra assembly efforts.

The present disclosure is directed to overcoming these and other problems of the prior art, including providing a grounding element which does not create additional manufacturing steps or take up much additional space within the rolling bearing assembly.

SUMMARY

In one aspect, the present disclosure is directed to a rolling bearing assembly. The rolling bearing assembly includes a first ring including a first race, a second ring including a second race, and a plurality of rolling elements in rolling contact with the first and second races. The rolling bearing assembly may also include a sealing assembly including a first end in contact with the first ring and a second end in contact with the second ring. The sealing assembly includes a shield, a sealing element, and a grounding element. The shield includes an attachment section in which a free end of the shield is crimped such that it is bent around the sealing element and the grounding element to thereby hold the shield, the sealing element, and the grounding element together with the shield in contact with the first ring and the grounding element in contact with the second ring. The sealing assembly thus creates an electrically conductive path between the first ring and the second ring.

In another aspect, the present disclosure is directed to a method of making a rolling bearing assembly. The method includes providing a first ring defining a first race, a second ring defining a second race, and a plurality of rolling elements in rolling contact with the first and second races. The method also includes positioning a shield in a groove formed in the first ring such that a supporting section of the shield is supported by a first side of the groove and a free end of the shield extends axially away from the first ring. The method also includes positioning a sealing element and a grounding element on the supporting section of the shield. The method further includes crimping the shield by pressing the free end of the shield to bend the free end around the sealing element and the grounding element and hold the shield, the sealing element, and the grounding element together by pressure in the groove with the grounding element in contact with the second ring thereby creating an electrically conductive path between the first ring and the second ring.

In yet another aspect, the present disclosure is directed to a method of making a rolling bearing assembly. The method includes providing a first ring defining a first race, a second ring defining a second race, and a plurality of rolling elements in rolling contact with the first and second races. The method also includes positioning a first shield in a groove formed in the first ring such that a supporting section of the shield is supported by a first side of the groove and a free end of the shield extends axially away from the first ring. The method further includes positioning a sealing element and a grounding element on the supporting section of the shield and positioning a second shield on the sealing element and the grounding element. The method additionally includes crimping the first shield by pressing the free end of the first shield to bend the free end around at least the second shield and hold the first shield, the second shield, the sealing element, and the grounding element together by pressure in the groove with the grounding element in contact with the second ring thereby creating an electrically conductive path between the first ring and the second ring.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

The present disclosure relates to a grounding element which is added to and/or integrated with the sealing components of a bearing in order to provide a grounding path for electrical currents. The grounding element is crimped with the sealing components of the bearing and may be seated in a groove formed in the outer ring. The crimping process may take place during bearing assembly and adding the grounding element during this step obviates the need for an additional step for grounding the bearing. Moreover, including the grounding element in the crimped seal results in the grounding element taking up only a small amount of space within the bearing. This configuration also creates the possibility of using the grounding element itself as a sealing component, further reducing bulk and the number of components in the bearing assembly.

Figure 1:
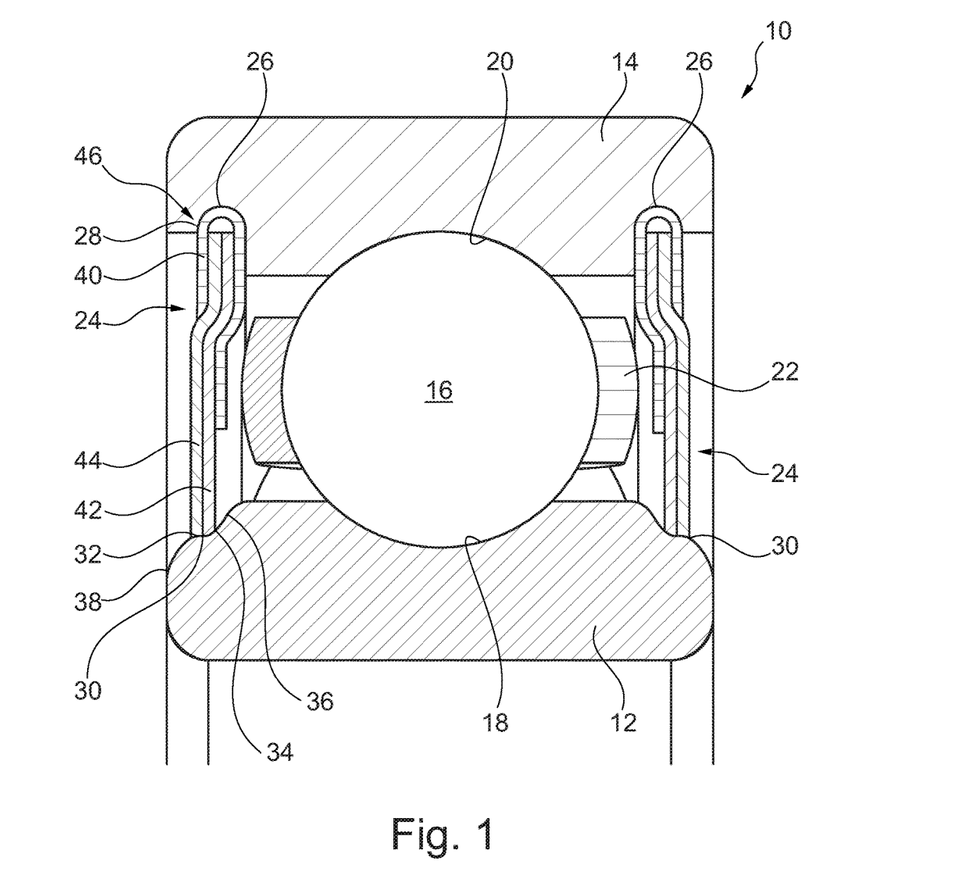
FIG. 1 is a cross-sectional view of a rolling bearing assembly, according to a first embodiment.
Figure 2:
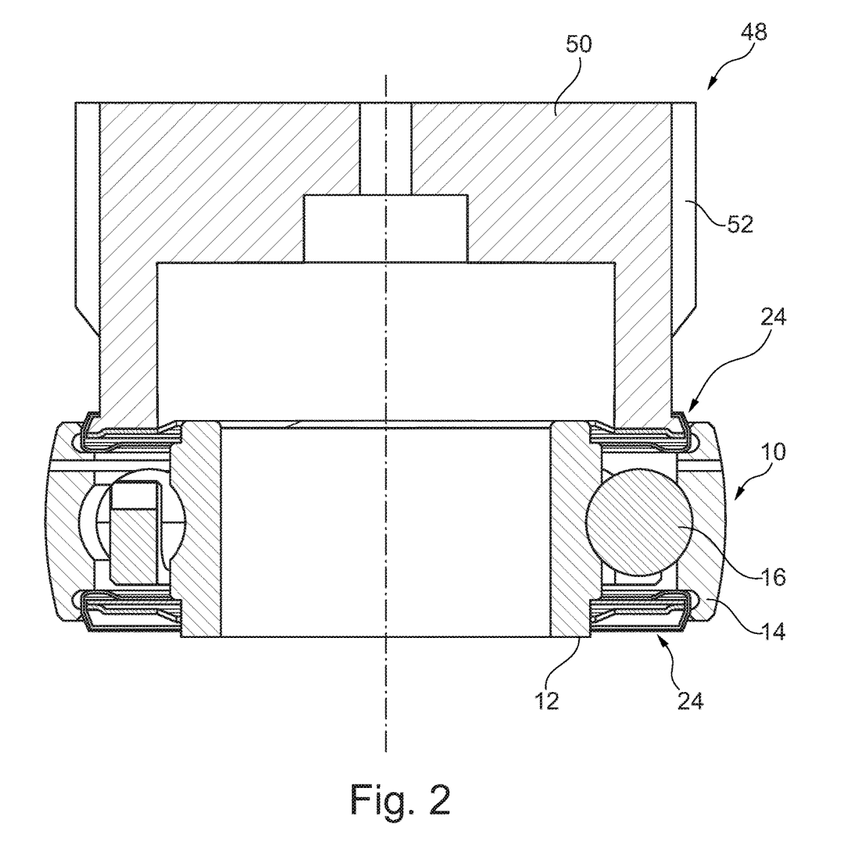
FIG. 2 is a cross-sectional view of the rolling bearing assembly of FIG. 1 in conjunction with a crimping tool.

FIGS. 1-2 illustrate an exemplary embodiment of a rolling bearing assembly 10. The rolling bearing assembly 10 includes a radially inner ring 12, a radially outer ring 14, and a plurality of rolling elements 16 supported to roll on a radially inner race 18 of the radially inner ring 12 and a radially outer race 20 of the radially outer ring 14. The rolling elements 16 are preferably balls, but could include other configurations, such as needles, cylindrical rollers, tapered rollers, or spherical/barrel shaped rollers. The rolling bearing assembly 10 further includes a cage 22 for the rolling elements 16.

Axial sides of the rolling bearing assembly 10 each include a sealing assembly 24 extending between the radially inner ring 12 and the radially outer ring 14. The radially outer ring 14 preferably includes a groove 26 formed at each contact point with the sealing assemblies. The grooves 26 are inward-facing and are preferably curved to form a continuous groove surface. A first end 28 of the sealing assembly 24 is inserted in the groove 26 to form a seal at the interface of the sealing assembly 24 and the radially outer ring 14.

The radially inner ring 12 includes contact surfaces 30 which face outwardly and radially oppose the grooves 26. A second end 32 of the sealing assembly 24 is positioned for sliding or stationary contact with contact surfaces 30 in order to form a seal at the interface of the sealing assembly 24 and the radially inner ring 12. This seal acts to keep lubricant from moving outward from the area of the rolling elements 16. The contact surfaces 30 may be formed as a ledge 34 which is positioned adjacent to a rising surface 36 which is closer to the rolling elements 16. On a side opposite from the rising surface 36, the ledge 34 is also adjacent to a chamfered edge 38 formed on an axially-outward side of the radially inner ring 12.

While the radially outer ring 14 is described as including the grooves 26 and the radially inner ring 12 is described as having the contact surfaces 30, it should be understood that these features may be reversed. For example, the grooves 26 may be formed in an outwardly-facing surface of the radially inner ring 12. In some embodiments, both the radially inner ring 12 and the radially outer ring 14 may include grooves 26 for receiving opposing ends 28, 32 of the sealing assembly 24.

In one embodiment, the sealing assembly 24 includes a shield 40, a sealing element 42, and a grounding element 44. The shield 40 is formed of a conductive material which is deformable through a crimping process. For example, the shield 40 may be formed from a thin sheet of metal. The sealing element 42 may be a conventional sealing material, such as a rubber or polymeric material, such as a polytetrafluoroethylene (PTFE) ring. The sealing element 42 preferably extends into sliding or stationary contact with the contact surface 30 in order to seal the second end 32 of the sealing assembly at the interface with the radially inner ring 12. This sealing helps to prevent lubricant from working axially outward from the area of the rolling elements 16 and separating the grounding element 44 from the mating ring (i.e., inner ring 12) which would undesirably increase impedance of the grounding element 44. The sealing element 42 is positioned closer to the rolling elements 16 for this reason. In some embodiments, an additional sealing element may be placed on an opposite side of the grounding element 44 to block materials (e.g., debris, lubricant, etc.) external to the rolling bearing assembly 10 from separating the grounding element 44 from the inner ring 12.

The grounding element 44 provides a conductive path for electrical current which is transmitted to the rolling bearing assembly 10. In one example, the grounding element 44 is a washer which includes a plurality of interwoven fibers and carbon particles fused to the fibers to carry and disperse the electrical current. The washer may be felt (e.g., a stiff carbon felt) with conductive fibers (e.g., metallic fibers, etc.) arranged at various angles within the washer. The washer is preferably compressible such that it can be held in place through pressure applied by a crimped layer. The grounding element 44 preferably extends from the first end 28 of the sealing assembly 24 to the second end 32 of the sealing assembly 24. The grounding element 44 is in direct contact with the shield 40 and the contact surface 30 of the inner ring 12.

As shown in FIG. 1, the shield 40 includes an attachment section 46 which includes the shield 40 being bent around ends of the sealing element 42 and the grounding element 44. The attachment section 46 is preferably crimped, as will be described in greater detail below. The attachment section 46 forms the first end 28 of the sealing assembly 24 and is configured to be received in the groove 26. This contact creates an electrical path from the radially outer ring 14 to the shield 40 to the grounding element 44 and also maintains the sealing element 42 and grounding element 44 in place.

A crimping process will now be described in more detail. FIG. 2 illustrates the rolling bearing assembly 10 during an assembly process. The assembly process uses a tool 48 to form and position the sealing assemblies 24. The tool 48 includes an inner member 50 and an outer member 52 which moves independently of the inner member 50. In some embodiments, the inner member 50 and the outer member 52 may be reversed, such as when the sealing assembly 24 is crimped at the radially inner ring 12.

The tool 48 presses on the sealing assemblies 24 to crimp the shield 40 onto the ends of the sealing element 42 and grounding element 44. In an exemplary embodiment, the inner member 50 presses on the grounding element 44 to hold it and the sealing element 42 down while the outer member crimps the shield 40 to create the attachment section 46 which compresses and holds the ends of the sealing element 42 and grounding element 44.

Figure 3:
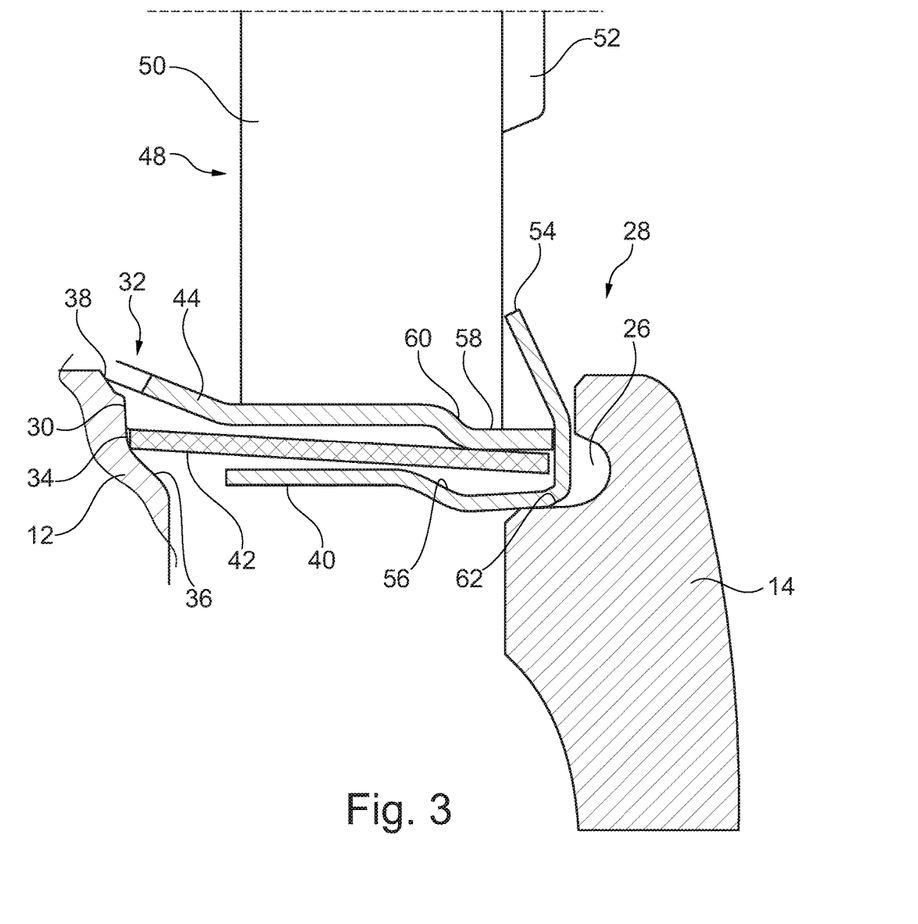
FIG. 3 is a cross-sectional view of a portion of the rolling bearing assembly of FIG. 1 with a sealing assembly in a first position prior to crimping.
Figure 4:
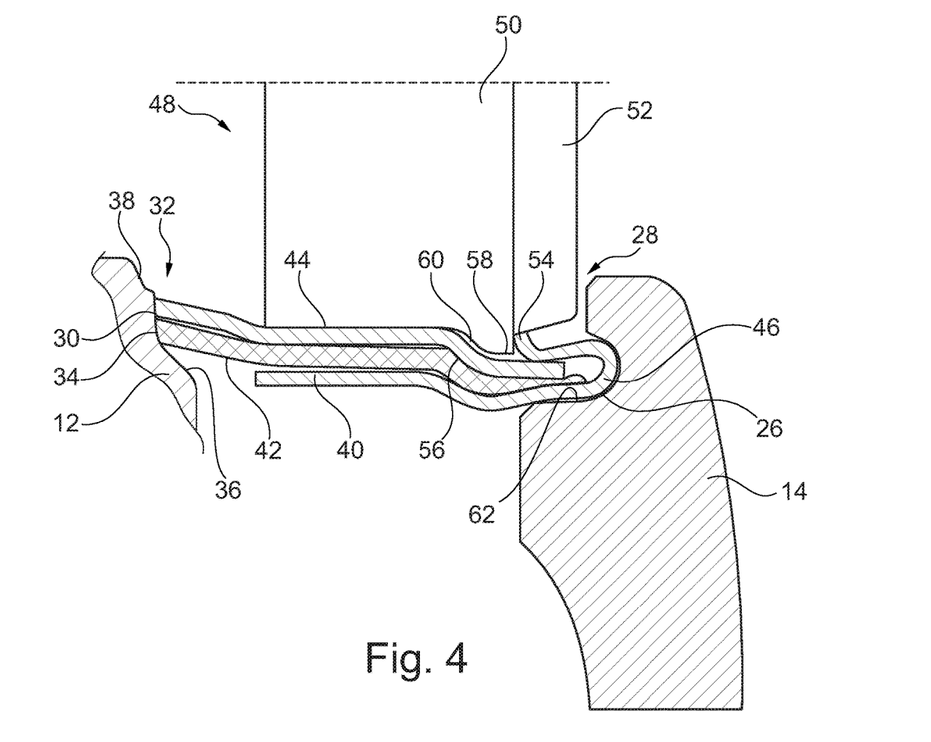
FIG. 4 is a cross-sectional view of the portion of the rolling bearing assembly of FIG. 1 with the sealing assembly in a second position after crimping.

FIGS. 3-4 further illustrate the crimping of the rolling bearing assembly 10 by the tool 48. As shown in FIG. 3, the shield 40 initially is open and includes a free end 54 which extends axially away from radially outer ring 14. This creates an open space for placement of the sealing element 42, which rests on a supporting section 56 of the shield 40, and the grounding element 44, which rests on the sealing element 42. In some embodiments, the positioning of the sealing element 42 and the grounding element 44 may be reversed. The sealing element 42 extends to the radially inner ring 12 and contacts the contacting surface 30 to form a seal at the second end 32 of the sealing assembly 24. The grounding element similarly extends to the radially inner ring 12, thereby creating an electrical path for the radially inner ring 12.

In an exemplary method of making the sealing assembly 24, the inner member 50 of the tool 48 presses on the grounding element 44. The inner member 50 may include a shaping ridge 58 which fits in and/or creates a deflected portion 60 of the grounding element 44 and/or sealing element 42. The groove 26 is preferably asymmetric such that one side 62 is longer than the other, creating a support surface for the supporting section 56 of the shield 40.

As shown in FIG. 4, the outer member 52 of the tool 48 is pressed downward onto the free end 54 of the shield 40, crimping the shield 40. This action forces the free end 54 to cover and press onto the grounding element 44 and sealing element 42, thereby forming the attachment section 46 and holding the shield 40, sealing element 42, and grounding element 44 together. The free end 54 moves into the space created by the deflected portion 60. In addition, the crimping action pushes the shield 40 further into contact with the radially outer ring 14, helping to retain the sealing assembly 24 in the groove 26 and to the radially outer ring 14 and increasing the contact area for current passage between 24 and 26.

In use, the grounding element 44 provides a conductive path for the rolling bearing assembly 10 which is formed between the radially inner ring 12 and the radially outer ring 14. This allows stray electrical currents to pass from the radially inner ring 12 to the radially outer ring 14, and vice versa, or from either ring to another element or grounded feature. This configuration inhibits current from arcing to or from the rolling elements 16 and races 18, 20. Keeping stray currents away from the rolling elements 16 and races 18, 20 helps to prevent EDM.

The disclosed sealing assembly 24 including the crimped shield 40 provides the above advantages of inhibiting EDM due to current arcs without adding significant bulk to the rolling bearing assembly 10 or complicating the assembly process. The grounding element 44 is added to the sealing assembly 24 and is crimped in place with the sealing element 42. The process of forming and positioning the sealing assembly 24 thus doubles as the process of adding the grounding element 44 to the rolling bearing assembly 10.

It should be understood that the disclosed embodiment is exemplary and that other configurations are possible. For example, in some embodiments, the sealing element 42 and the grounding element 44 may be the same component (e.g., formed as one integral component), such as an electrically-conductive sealing element, which is crimped by the shield 40 into place on the rolling bearing assembly 10.

Figure 5:
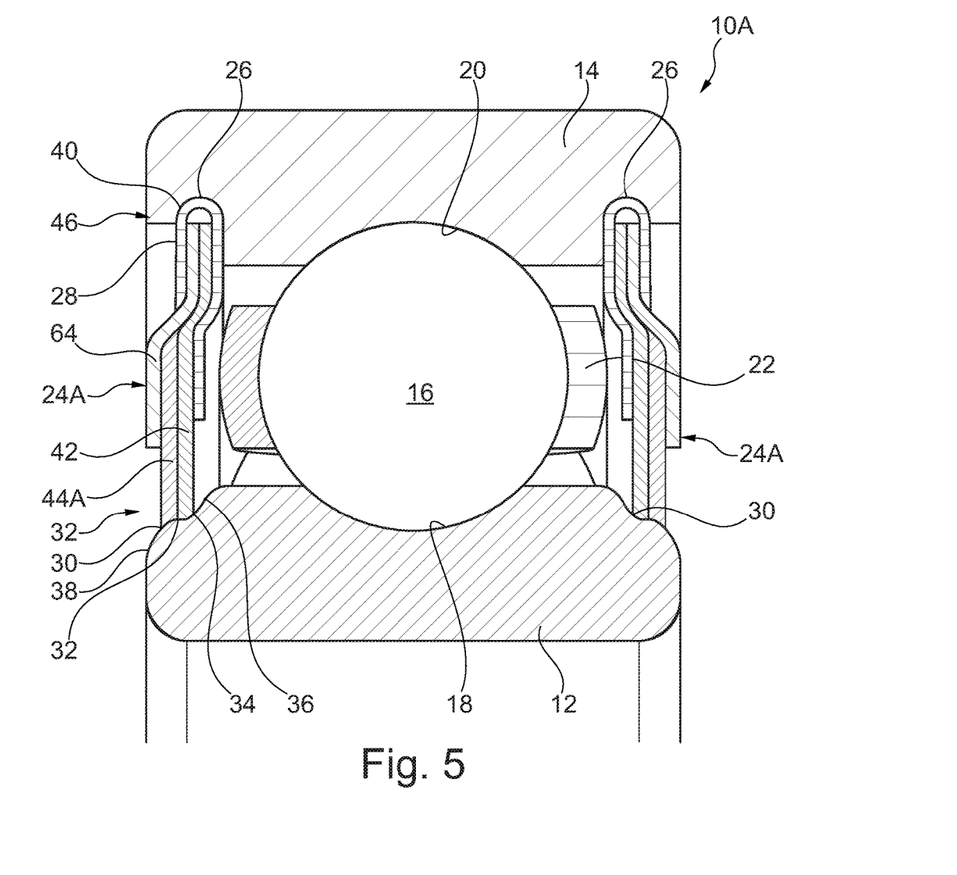
FIG. 5 is a cross-sectional view of a rolling bearing assembly, according to another embodiment.
Figure 6:
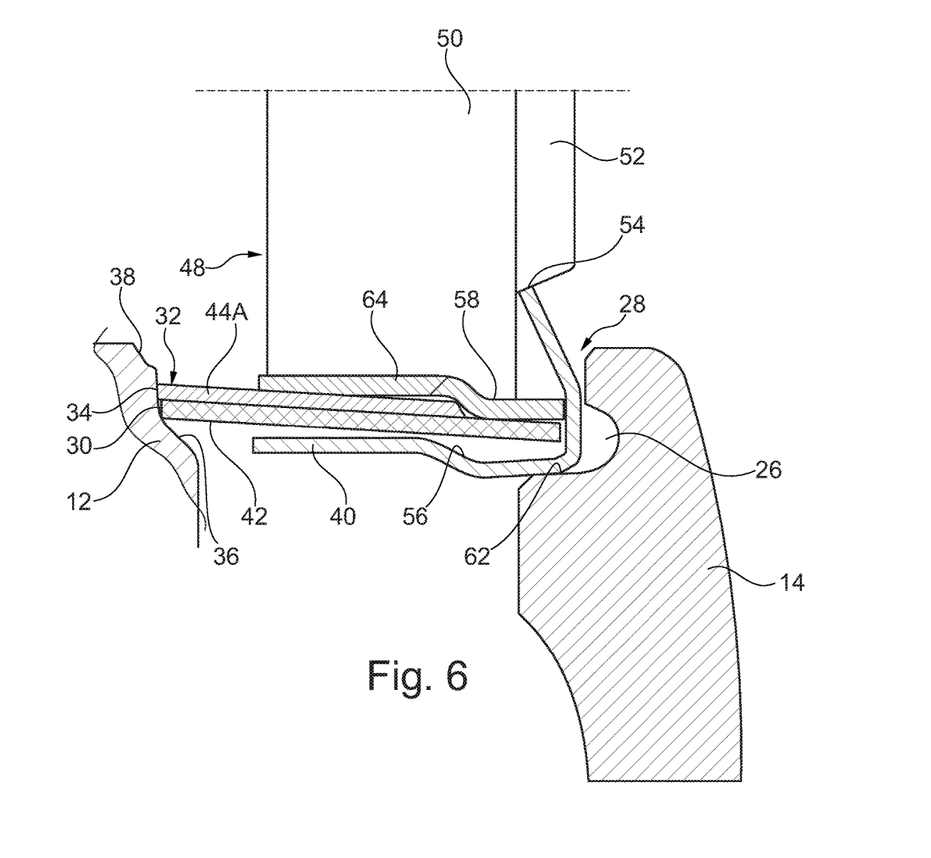
FIG. 6 is a cross-sectional view of a portion of the rolling bearing assembly of FIG. 5 with a sealing assembly in a first position prior to crimping.
Figure 7:
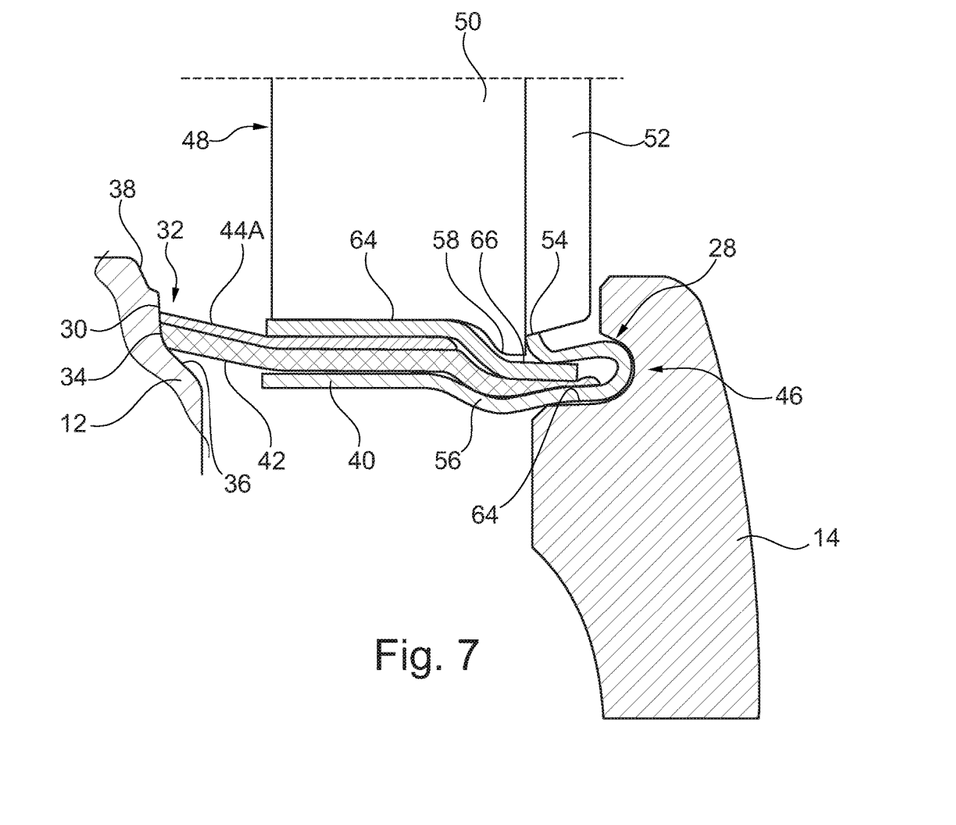
FIG. 7 is a cross-sectional view of the portion of the rolling bearing assembly of FIG. 5 with the sealing assembly in a second position after crimping.

FIGS. 5-7 further illustrate another exemplary embodiment of a rolling bearing assembly 10A in which the sealing assembly 24A includes a second shield 64 which is crimped by the first shield 40 and which holds the grounding element 44A in place against the sealing element 42 and the contact surface 30. As shown in FIG. 6, the second shield 64 overlaps the grounding element 44A. The shaping ridge 58 fits in and/or creates a deflected portion 66 of the second shield 64.

As shown in FIG. 7, the outer member 52 of the tool 48 is pressed downward onto the free end 54 of the first shield 40, crimping the first shield 40 onto the second shield 64 and the sealing element 42. This action presses and deforms these components into each other, thereby holding the first shield 40, second shield 64, and sealing element 42 to each other. The second shield 64 is indirectly pressed into the grounding element 44A, thereby holding the grounding element 44A in place between the second shield 64 and the sealing element 42. In other words, the grounding element 44A is indirectly held to the first shield 40 through pressure applied by the second shield 64. A conductive path is thus formed between the radially inner ring 12 and the radially outer ring 14 by the first shield 40, the second shield 64, and the grounding element 44A being in contact with each other and the rings 12, 14.

This alternative embodiment includes the second shield 64 being crimped and the grounding element 44A being indirectly pressed into position. This may help to prevent excessive stresses within the grounding element 44A and/or at least partially shields the grounding element 44A from being contacted and possibly damaged by outside elements. In still another embodiment, the sealing element 42 and the grounding element 44 are the same component (e.g., one integral component), such as an electrically-conductive sealing element, which is crimped between the first shield 40 and the second shield 64.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

COMPONENT LIST

10. Rolling Bearing Assembly
12. Radially Inner Ring
14. Radially Outer Ring
16. Rolling Elements
18. Radially Inner Race
20. Radially Outer Race
22. Cage
24. Sealing Assembly
26. Groove
28. End
30. Contact Surface
32. End
34. Ledge
36. Rising Surface
38. Chamfered Edge
40. Shield
42. Sealing Element
44. Grounding Element
46. Attachment Section
48. Tool
50. Inner Member
52. Outer Member
54. Free End
56. Supporting Section
58. Shaping Ridge
60. Deflected Portion
62. Side
64. Second Shield
66. Deflected Portion

What is claimed is:
1. A rolling bearing assembly, comprising:
a first ring including a first race;
a second ring including a second race;

a plurality of rolling elements in rolling contact with the first and second races; and a sealing assembly including a first end in contact with the first ring and a second end in contact with the second ring, the sealing assembly including a shield, a sealing element, and a grounding element, the grounding element is a washer including a plurality of interwoven fibers and the washer is carbon-infused, wherein the shield includes an attachment section in which a free end of the shield is crimped such that it is bent around the sealing element and the grounding element to thereby hold the shield, the sealing element, and the grounding element together with the shield in contact with the first ring and the grounding element in contact with the second ring, thereby creating an electrically conductive path between the first ring and the second ring.

2. The rolling bearing assembly of claim 1, wherein the first ring includes a groove which receives the attachment section of the shield.

3. The rolling bearing assembly of claim 2, wherein the first ring is a radially outer ring.

4. The rolling bearing assembly of claim 2, wherein the first ring is a radially inner ring.

5. The rolling bearing assembly of claim 2, wherein the groove is asymmetric such that one side is longer than the other and a supporting section of the shield contacts the one side.

6. The rolling bearing assembly of claim 2, wherein the second ring includes a contact surface which radially opposes the groove and which is in contact with the sealing element.

7. The rolling bearing assembly of claim 6, wherein the contact surface includes a ledge which is adjacent to a rising surface and the sealing element rests against the rising surface.

8. The rolling bearing assembly of claim 1, wherein the shield is a sheet metal material.

9. The rolling bearing assembly of claim 1, wherein the sealing element is a rubber or polymeric material.

10. The rolling bearing assembly of claim 1, wherein the sealing element and the grounding element are one integral component.

11. The rolling bearing assembly of claim 1, wherein the sealing assembly further comprises a second shield which overlaps the grounding element such that the shield is bent around the second shield in the attachment section and the grounding element is indirectly held to the shield through pressure applied by the second shield.

12. A method of making a rolling bearing assembly comprising:

providing a first ring defining a first race, a second ring defining a second race, and a plurality of rolling elements in rolling contact with the first and second races;

positioning a shield in a groove formed in the first ring such that a supporting section of the shield is supported by a first side of the groove and a free end of the shield extends axially away from the first ring;

positioning a sealing element and a grounding element on the supporting section of the shield, the grounding element is a washer including a plurality of interwoven fibers and the washer is carbon-infused;

crimping the shield by pressing the free end of the shield to bend the free end around the sealing element and the grounding element and hold the shield, the sealing element, and the grounding element together by pressure in the groove with the grounding element in contact with the second ring thereby creating an electrically conductive path between the first ring and the second ring.

13. The method of claim 12, wherein crimping the shield moves the shield into or further into the groove.

14. The method of claim 12, wherein a tool is used to crimp the shield, the tool including a first member which applies pressure to the sealing element and the grounding element and a second member which moves independently of the first member and which presses the free end of the shield to bend the shield.

15. The method of claim 12, wherein the sealing element and the grounding element are integrally formed as one component.

16. A method of making a rolling bearing assembly comprising:

providing a first ring defining a first race, a second ring defining a second race, and a plurality of rolling elements in rolling contact with the first and second races;

positioning a first shield in a groove formed in the first ring such that a supporting section of the shield is supported by a first side of the groove and a free end of the shield extends axially away from the first ring;

positioning a sealing element and a grounding element on the supporting section of the shield, the grounding element is a washer including a plurality of interwoven fibers and the washer is carbon-infused;

positioning a second shield on the sealing element and the grounding element;

crimping the first shield by pressing the free end of the first shield to bend the free end around at least the second shield and hold the first shield, the second shield, the sealing element, and the grounding element together by pressure in the groove with the grounding element in contact with the second ring thereby creating an electrically conductive path between the first ring and the second ring.

17. The method of claim 16, wherein crimping the first shield moves the first shield into or further into the groove.

18. The method of claim 16, wherein a tool is used to crimp the first shield, the tool including a first member which applies pressure to the second shield, the sealing element, and the grounding element, and a second member which moves independently of the first member and which presses the free end of the shield to bend the shield.

* * * * *